(12) United States Patent
Chabanne et al.

(10) Patent No.: US 10,326,598 B2
(45) Date of Patent: Jun. 18, 2019

(54) METHOD FOR GENERATING A MESSAGE SIGNATURE FROM A SIGNATURE TOKEN ENCRYPTED BY MEANS OF A HOMOMORPHIC ENCRYPTION FUNCTION

(71) Applicant: MORPHO, Issy-les-Moulineaux (FR)

(72) Inventors: Herve Chabanne, Issy-les-Moulineaux (FR); Constance Morel, Issy-les-Moulineaux (FR); Olivier Clemot, Issy-les-Moulineaux (FR); Julien Bringer, Issy-les-Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 265 days.

(21) Appl. No.: 15/144,636

(22) Filed: May 2, 2016

(65) Prior Publication Data

US 2016/0344557 A1    Nov. 24, 2016

(30) Foreign Application Priority Data

May 6, 2015    (FR) ...................................... 15 54077

(51) Int. Cl.
*H04L 9/32*    (2006.01)
*H04L 9/00*    (2006.01)
*H04L 9/30*    (2006.01)

(52) U.S. Cl.
CPC ............ *H04L 9/3247* (2013.01); *H04L 9/008* (2013.01); *H04L 9/3066* (2013.01); *H04L 9/3252* (2013.01)

(58) Field of Classification Search
None
See application file for complete search history.

(56) References Cited

U.S. PATENT DOCUMENTS

| | | | |
|---|---|---|---|
| 2013/0326224 A1* | 12/2013 | Yavuz | H04L 9/3247 713/176 |
| 2016/0191252 A1* | 6/2016 | Li | H04L 9/3066 380/28 |
| 2016/0269174 A1* | 9/2016 | Yasuda | H04L 9/008 |

FOREIGN PATENT DOCUMENTS

EP    0 807 908 A2    11/1997

OTHER PUBLICATIONS

Hankerson et al. "Guide to Elliptic Curve Cryptography." Springer-Verlag New York, Inc. (2004). pp. 1-332. 332 pages.
(Continued)

*Primary Examiner* — Lynn D Feild
*Assistant Examiner* — Vadim Savenkov
(74) *Attorney, Agent, or Firm* — Womble Bond Dickinson (US) LLP

(57) ABSTRACT

A method for generating a message signature intended to be validated by a verifier server. A client device is configured to hold a private key and a corresponding public key. The method includes offline pre-computation by a hardware security module of a signature token, a result of encryption using a homomorphic encryption function, storage of the signature token generation of the signature of the encrypted message by the homomorphic encryption function from the result of the encryption by the homomorphic encryption function of the private key stored by the client device, of the signature token and of the message. The signature is intended to be validated by the verifier server by the public key.

11 Claims, 2 Drawing Sheets

(56) References Cited

OTHER PUBLICATIONS

Gennaro et al. "Non-Interactive Verifiable Computing: Outsourcing Computation to Untrusted Workers." CRYPTO 2010, LNCS 6223 (2010). pp. 465-482. 18 pages.
Paillier. "Public-Key Cryptosystems Based on Composite Degree Residuosity Classes." EUROCRYPT '99, LNCS 1592 (1999). pp. 223-238. 16 pages.

* cited by examiner

METHOD FOR GENERATING A MESSAGE SIGNATURE FROM A SIGNATURE TOKEN ENCRYPTED BY MEANS OF A HOMOMORPHIC ENCRYPTION FUNCTION

FIELD OF THE INVENTION

The present invention relates in general to the generation of a digital signature of a message.

The invention relates more precisely to a method for signing with tokens based on a digital signature algorithm.

STATE OF THE ART

Many digital signature methods are currently used in cryptography to generate, for a digital message, a signature guaranteeing the identity of the sender of this message.

To guarantee a high level of security, these methods can comprise complex operations needing considerable computation capacity. Such computing power needs can turn out to be problematic during the execution of such signature methods for the signing of messages in real time, particularly when these methods are performed on systems having reduced resources, such as a smart card.

With the goal of reducing the number of computations to be performed during signing, signature methods for performing some of these computations in advance have been developed. In this category of signature methods, signatures with token or coupon provide for the computation, prior to the signing of a message, of a token independent of this message, the storage of this token and its reuse during signing of a message for computing said signature. Such signature methods deport upstream of the signature the most complex computations and restrict to a minimum the needs for computation power during generation of the signature itself. An example of such a signature method by token is explained in Benoît Chevallier—Mames, *New signature schemes with coupons and tight reduction*, Applied Cryptography and Network Security—ACNS 2005, volume 3531, Lecture Notes in Computer Science, pages 513-528. SpringerVerlag, 2005.

Of the many existing signature methods some methods needing to make substantial computations during signing are those methods based on the DSA algorithm ("Digital Signature Algorithm") or the ECDSA algorithm ("Elliptic Curve Digital Signature Algorithm") based on elliptic curves. At each signing of a message, the methods based on these algorithms include respectively computation of exponentiation $g^k$ with k random integer or coordinates of a point of an elliptic curve by multiplying a generator g of an elliptic curve by a random k as integer. Such computations are very costly operations, particularly for a light client such as a smart card.

Unfortunately, such a computation cannot be anticipated assuredly, as in the case of a signature with token. In fact, in case of pre-computation and storage of a couple (k, abscissa (k*g)) or (k, $g^k$ mod p), if a hacker succeeds in gaining knowledge of such values and a signature generated from the latter according to the DSA or ECDSA algorithm, he could obtain information on the private key of the signatory. This hacker could fraudulently sign messages in the name of said signatory.

There is therefore a need for a signature method for anticipating prior to signing of a message the costliest computations such as determination of a point of an elliptic curve, without endangering the security of the signature mechanism.

SUMMARY OF THE INVENTION

For this purpose, according to a first aspect, the present invention relates to a method for generating a signature of a message intended to be validated by a verifier server, the signature protocol implemented for generating the signature comprising public parameters ($G_r$, n, g) such that g is an element of the group $G_r$, of the order n with n a prime integer, a client device being configured to hold a private key and a corresponding public key, said method being characterized in that it comprises steps of:

offline precomputation by a hardware security module of a signature token comprising a first part of signature token $\varphi(r)$ and a second part of signature token $\varphi(1/k)$, wherein k is a random integer comprised between 1 and n−1, and r is an intermediate integer defined by $r=f(g^k)$ where f is a function having values in $\mathbb{Z}_n$, and the first part of signature token $\varphi(r)$ is generated by encrypting the intermediate integer r by means of said homomorphic encryption function ($\varphi$) and the second part of signature token $\varphi(1/k)$ is generated by encrypting the inverse of the random 1/k by means of said homomorphic encryption function ($\varphi$), storage of said signature token;

generation of said signature of said encrypted message by means of said homomorphic encryption function from the result of the encryption by said homomorphic encryption function of the private key stored by the client device, of the signature token and of said message, said signature being intended to be validated by said verifier server by means of said public key.

The complex steps of computation of the signature can be conducted in advance without compromise of the security due to encryption of the token serving to store the result of these computations. Computation of the signature can also be delegated by the client device to another device without the latter needing to know either the message to be signed or the decrypted token, or the private key of the client so as not to endanger the security of the signature mechanism.

Advantageously, though optionally, the generation steps of the random k and computation of the intermediate integer are also implemented previously offline by the hardware security module.

In the case of execution according to the ECDSA protocol, the group $G_r$ is the group comprising all the points of an elliptic curve provided with addition, the public key y and the private key d can verify y=d*g, g being a point of an elliptic curve of the order n, a prime integer, and the method for generating a signature according to the first aspect can also comprise prior offline execution by said hardware security module of steps of:

generation of a random k as integer belonging to [1;n−1];

computation of the intermediate integer abscissa of the point of the elliptic curve k*g modulo n;

said signature token comprising a first part of signature token generated by encrypting the computed intermediate integer by means of said homomorphic encryption function and a second part of signature token generated by encrypting the inverse of the random by means of said homomorphic encryption function.

In the case of execution according to the DSA protocol, the group $G_r$ is the set $\mathbb{Z}_p$ provided with multiplication, where p is a prime integer number such that (p−1) is a multiple of n, the public key y and the private key d such that $0<d<q$ verify $y=g^d \bmod p$, n being a prime number, $g=h^{((p-1)/n)} \bmod p$ with h a random integer verifying $1<h<p-1$ and g different to 1, and the method for generating a signature according to the first aspect can also comprise previously offline execution by said hardware security module of steps of:

generation of a random k as integer belonging to $[1;n-1]$;
computation of the intermediate integer $r=(g^k \bmod p) \bmod n$;

said signature token comprising a first part of signature token generated by encrypting the computed intermediate integer by means of said homomorphic encryption function and a second part of signature token generated by encrypting the inverse of the random by means of said homomorphic encryption function.

In a first embodiment, the signature of the message m encrypted by means of said homomorphic encryption function φ (p can comprise a first part of signature encrypted by means of said homomorphic encryption function and generated by means of the formula: $\varphi(s)=\varphi(1/k)*(z+d.r))$ and a second part of signature encrypted by means of said homomorphic encryption function equal to $\varphi(r)$, with 1/k the inverse of the random, z function of the message m, d the private key stored by the client device, r the computed intermediate integer and φ the homomorphic encryption function.

The client can delegate computation of the first part of signature directly in encrypted form solely from $\varphi(d)$, the message and the encrypted token without decrypting the elements assisting its computation. The client device only has to compute $\varphi(d)$ at a minimum, further reducing the cost of generation of the signature for the latter.

In a second embodiment, the signature token can further comprise the result of encryption by said homomorphic encryption function of the product of the computed intermediate integer with the inverse of the random.

In this second embodiment, the signature of the message m encrypted by means of said homomorphic encryption function can comprise a first part of signature encrypted by means of said homomorphic encryption function and generated by means of the formula: $\varphi(s)=\varphi((1/k).z+d.(r.1/k))$ and a second part of signature encrypted by means of said homomorphic encryption function equal to $\varphi(r)$, with 1/k the inverse of the random, z function of the message m, d the private key stored by the client device, r the computed intermediate integer, r.1/k the product of the computed intermediate integer with the inverse of the random and φ the homomorphic encryption function.

The signature can be computed without having to compute homomorphic multiplication of the order 2, further reducing the cost for generating the signature.

The present invention according to a second aspect relates to a computer program product comprising program code instructions for executing the steps of the method according to the first aspect when said program is executed on a computer.

The present invention relates according to a third aspect to a system for generating a signature of a message intended to be validated by a verifier server, a client device being configured to hold a private key and a corresponding public key, said system comprising:

a hardware security module configured to precompute, offline, a signature token as a result of encryption by means of a homomorphic encryption function, a storage device of said signature token, an intermediate server or said hardware security module configured to generate said signature of said encrypted message by means of said homomorphic encryption function from the result of the encryption by said homomorphic encryption function of the private key stored by the client device, of the signature token and of said message, a verifier server configured to validate said signature by means of said public key.

In an embodiment, the invention relates to a method for generating a signature of a message intended to be validated by a verifier server, wherein the protocol conducted for generating the signature is DSA or ECDSA protocol, a client device being configured to hold a private key d and a corresponding public key y, where, in the case of ECDSA protocol, the public key and the private key verify $y=d*g$ where g is a point of an elliptic curve of the prime order n, and in the case of DSA protocol the private key d is such that $0<d<n$ and verifies with the public key $y=g^d \bmod p$, n being a prime number, p being a prime number verifying (p-1) is a multiple of n, $g=h^{((p-1)/n)} \bmod p$ with h a random integer verifying $1<h<p-1$ and g different to 1, said method being characterized in that it comprises steps of:

generation of a random k as integer belonging to $[1;n-1]$
computation of an intermediate integer r, where r is the abscissa of the point of the elliptic curve $k*g$ modulo n in the case of ECDSA protocol and equal to $(g^k \bmod p) \bmod n$ in the case of DSA protocol, offline precomputation by a hardware security module of a signature token $\varphi(r), \varphi(1/k)$ comprising a first part of signature token $\varphi(r)$ generated by encrypting the computed intermediate integer r and a second part of signature token $\varphi(1/k)$, generated by encrypting the inverse of the random 1/k by means of said homomorphic encryption function, storage of said signature token $(\varphi(r), \varphi(1/k))$;

generation of said signature (r,s) of said message (m) encrypted by means of said homomorphic encryption function $(\varphi(r), \varphi(s))$ from the result $(\varphi(d))$ of the encryption by said homomorphic encryption function of the private key stored by the client device d, of the signature token $(\varphi(r), \varphi(1/k))$ and of said message, said signature being intended to be validated by said verifier server by means of said public key y.

Such computer program product and system for generating signature have the same advantages as those mentioned for the method according to the first aspect.

DESCRIPTION OF FIGURES

Other characteristics and advantages will emerge from the following description which is purely illustrative and non-limiting and must be considered relative to the appended figures, wherein.

DETAILED DESCRIPTION OF AT LEAST ONE EMBODIMENT

Figure 1:
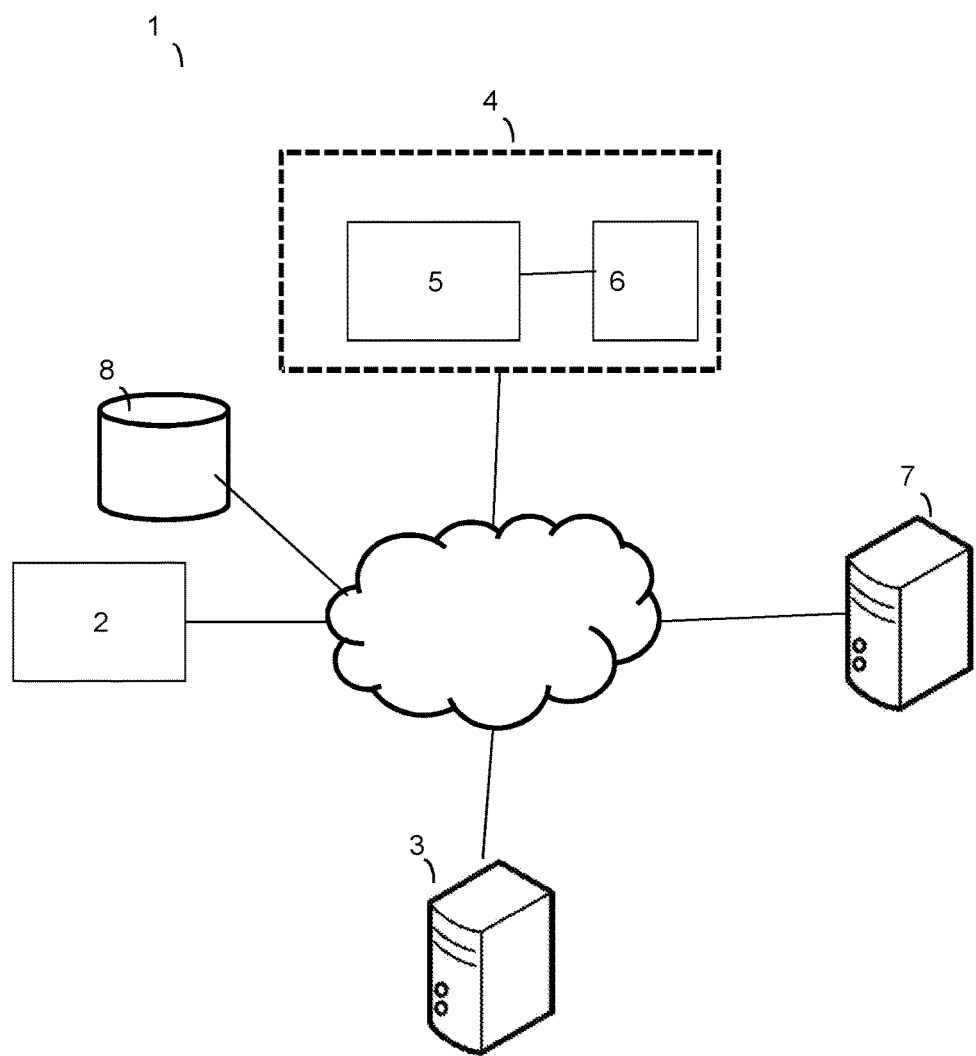
FIG. 1 schematically illustrates hardware means in a system for generating signature according to an embodiment of the invention.

An embodiment relates to a method for generating a signature of a message m executed by a system for generating signature 1 illustrated in FIG. 1. Such a system for generating signature can comprise a client device 2 requiring generation of the signature for a message m to be signed and a verifier server 3 intended to validate the signature of said message m.

Such a system for generating signature further comprises a hardware security module 4 intended to securely perform steps of computation of the signature, especially the costly steps which can be implemented independently of the message m. These computations can be made in advance, upstream of generation of the signature for the client device.

Such a hardware security module can be a HSM (Hardware Security Module) or a smart card or any other secure device fitted with processing means such as a secure computer, for example a computer isolated from the outside world. Such a hardware security module 4 can comprise a random number generator 5 and a computer 6 and can be configured to be connected to the client device.

The client device 2 does not necessarily comprise substantial computation means for implementing the steps of generation of the signature which are not implemented on the hardware security module 4. The system for generating signature can also comprise an intermediate server 7 configured to be connected to the hardware security module 4, and to which the latter can delegate computation steps. Such a connection can be local or remote, by way of a communications network such as an Ethernet network or the Internet.

The client device 2 is configured to hold a private key and the corresponding public key.

The method proposes taking on the hardware security module the costly steps which can be implemented independently of the message m in advance, i.e, before it is known (offline) and the result of these computations is stored in the form of a token. To ensure the security of the signature mechanism during reuse of this token for computing a signature for the message m, the invention proposes keeping this token in encrypted form. To prevent a hacker finding out this token, without as such needing costly decryption computations during computation of the signature, the token can be encrypted by means of a homomorphic function. Such a function computes on the fly (online) an encrypted signature from the encrypted token without having to decrypt the latter. Computation of such a signature can also be delegated by the client device to another device without compromising the security of the signature method.

The system for generating signature can also comprise a storage device 8 for the storage of the token. Such a storage device can be integrated into the hardware security module or else be independent and connected to the other elements of the system for generating signature by means of a communications network.

Figure 2:
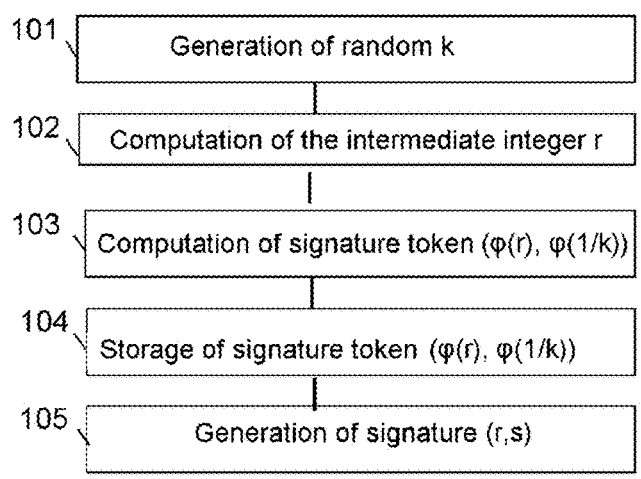
FIG. 2 illustrates a flowchart representing execution of a method for generating a signature of a message according to the invention.

Carrying out the method for generating a signature of a message m can comprise as illustrated in FIG. 2 steps of:

offline beforehand computation 103 by the hardware security module 4 of a signature token ($\varphi(r)$, $\varphi(1/k)$) result of encryption by means of a homomorphic encryption function $\varphi$, storage 104 of said signature token $\varphi(r)$, $\varphi(1/k)$;

generation 105 of said signature (r,S) of said message m encrypted by means of said homomorphic encryption function $\varphi(r)$, $\varphi(s)$) from the result of the encryption by said homomorphic encryption function of the private key stored by the client device, of the signature token ($\varphi(r)$, $\varphi(1/k)$) and of said message m, said signature being intended to be validated by said verifier server 3 by means of said public key.

This step for generating signature can be conducted by the hardware security module 4 or the intermediate server 7. The signature computation is delegated to the hardware security module or to this intermediate server, which reduces costs of computations made by the client device.

Also, due to the homomorphism property of homomorphic encryption the intermediate server can compute the signature without performing decryption and therefore there is no need to be sure to not endanger the security of the signature.

As a reminder, such a homomorphic function $\varphi$ is a function such that, for a masking operation M such as multiplication by a mask datum a, there is an operation O, such as exponentiation by a, such as $O(\varphi(x))=\varphi(M(x))$, i.e, $(\varphi(x))\hat{}a=\varphi(x*a)$. Such a function can also be homomorphic between two operations Op1 and Op2 if performing the operation Op2 on ($\varphi(x)$, $\varphi(y)$) produces $\varphi$ (x Op1 y). Hereinbelow "homomorphic multiplication of the order 1" means multiplication performed between two ciphertexts which have not undergone any prior multiplication and "homomorphic multiplication of the order 2" means multiplication performed between a ciphertext having already undergone multiplication and a ciphertext having already undergone more than one multiplication.

A pair of asymmetric encryption keys (pk$\varphi$, sk$\varphi$) dedicated to executing the homomorphic encryption algorithm $\varphi$ can be generated earlier, for example by the hardware security module, by another hardware security module, by the client device or by the verifier server which then has the private key sk$\varphi$. The public key pk$\varphi$ is shared with the other elements of the system for generating signature 1. Such an algorithm can for example be the Paillier algorithm according to the following reference: Pascal Paillier, *Public-key cryptosystems based on composite degree residuosity classes*, EUROCRYPT 1999, 223-238. This reference proposes a additively homomorphic scheme. The latter can be transformed into a homomorphic scheme capable of evaluating polynomials of degree 2 by application of a method such as the method by Catalano and Fiore presented in the article *Boosting linearly homomorphic encryption to evaluate degree-2 functions on encrypted data*, Cryptology ePrint Archive, 2014, p813. Such a homomorphic encryption algorithm can also be an algorithm for performing a limited number of additions and multiplications on the ciphertext, specifically an algorithm so-called "Somewhat homomorphic encryption" (SHE). Such algorithms are presented in the article by Zvika Brakerski and Vinod Vaikuntanathan called "Fully Homomorphic Encryption from RingLWE and Security for KeyDependent Messages" and the article by Zvika Brakerski, Craig Gentry, and Vinod Vaikuntanathan called "(Leveled) fully homomorphic encryption without bootstrapping" In ITCS, pages 309-325, 2012.

The hardware security module 4 can have the private key of said pair of asymmetric encryption keys skci so as to decrypt the signature tokens. It can also generate the private key skci, transmit it to the verifier server 3 and not keep it after this transmission. But the intermediate server does not have this private key, as it is not considered secure.

The signature can by way of example be a signature generated according to DSA protocol ("Digital Signature Algorithm") or ECDSA protocol ("Elliptic Curve Digital Signature Algorithm") detailed hereinbelow.

The execution of the method for generating signature according to the invention can comprise in more detail the steps described in the paragraphs hereinbelow in reference to FIG. 2.

In all cases computations are performed in a group $G_r$, provided with an internal composition law noted o. With a noted as an element of this group, the following notation is adopted:

$$a^m = a \circ \ldots \circ a$$

Where the operation o is applied m times, and m is a strictly positive integer.

It is also noted hereinbelow that g is an element of the group of the order n, where n is a prime number. $G_r$, g and n are the public parameters of the signature protocol.

In the case of execution according to DSA protocol, the public key y and the private key d such as 0<d<n can verify $y=g^d$ mod p with n a prime number, p a prime number verifying (p−1) is a multiple of n, $g=h^{((p-1)/n)}$ mod p, h being a random integer verifying 1<h<p−1 and g being different to 1. Constructed in this way, g is an element of the order n of the group $\mathbb{Z}_p$. The elements (p, n, g), are the parameters of the DSA protocol.

In the case of execution according to ECDSA protocol, the public key y and the private key d randomly selected in [1; n−1] with n a prime integer, can verify y=d*g, g being a point of an elliptic curve of the order n. By way of example n can be equal to 256 bits for security of 128 bits.

During a generation step of random 101, the random number generator 5 of the hardware security module 4 can previously generate, offline, a random k as integer belonging to [1;n−1], whether in an embodiment according to ECDSA protocol or according to DSA protocol.

Next, during step 102, the computer 6 of the hardware security module computes the intermediate integer $r=f(g^k)$, where f is a function taking as input an element of the group $G_r$, and having values in $\mathbb{Z}_n$, i.e, f transforms an element of the group into an element of $\mathbb{Z}_n$.

In the case of DSA protocol, the group $G_r$, corresponds to the multiplication group $\mathbb{Z}_p$, i.e, the operation o is multiplication, and p is the prime number introduced hereinbelow, and the function f is such that f(x)=x mod n.

In the case of ECDSA protocol, the group $G_r$, corresponds to all the points of the elliptic curve provided with addition, i.e, the operation o is the addition. In this case the function f is a function which at a point x of the curve associates its abscissa modulo n.

So in the case of execution according to DSA or ECDSA protocol, the computer 6 of the hardware security module 4 can respectively compute, during a computation step of integer 102, the intermediate integer $r=(g^k$ mod p) mod n or more simply $r=g^k$ mod n since $g^k$ is computed in the multiplication group $Z_p$ or else a point of the elliptic curve by computing k*g (multiplication of the point g of the elliptic curve by the scalar k), then the intermediate integer r corresponding to the abscissa of this point modulo n.

A signature token is then computed offline, i.e, well before the computer 6 of the hardware security module 4 knowing the message m during a computation step of signature token 103 and stored in the storage device 8 during a storage step of signature token 104. Such a token can be the result of encryption by means of the homomorphic encryption function φ. Such a signature token is stored securely and enables later online generation of the signature of the message m intended to be validated by the verifier server by means of the public key y. Delegation of these computation steps to the hardware security module during a previous offline step noticeably reduces the cost of generating a signature for the client device, and therefore computes a signature for a particular message much faster.

The steps for generating random 101, computation of point 102 and computation of signature token 103 can be repeated so as to generate in advance and store a multitude of encrypted tokens, ready for use for computing a signature.

The signature token stored is then transmitted if needed to the device to which the client device delegates generation of the signature for the message m, i.e, to the intermediate server 7 or the hardware security module 4

The client device 2 sends to the intermediate server 7 or the hardware security module 4 the result φ(d) of encryption by said homomorphic encryption function φ of the stored private key d. The client device can also transmit the result φ(z) of encryption by said homomorphic encryption function φ of an element z function of the message m.

The element z function of the message m used for computation of the signature can be the result of the application of a hashing function to the message m such as SHA-2, especially so as to obtain for the signature a message datum z of selected fixed size, irrespective of the length of the message m.

Alternatively, the client device can transmit the message m directly. The intermediate server or the hardware security module can compute from the latter the element z and the ciphertext φ(z).

Alternatively, the client device cannot hold the message m. The intermediate server or the hardware security module can obtain by itself the message m from an external entity and compute from the latter the element z and the ciphertext φ(z).

The intermediate server 7 or the hardware security module 4 generates during a step for generating signature 105 said signature (r,s) of said message m encrypted by means of said homomorphic encryption function (φ(r),φ(s)) from the result φ(d) of the encryption by said homomorphic encryption function of the private key d stored by the client device, of the signature token (φ(r), φ(1/k)) and of the result φ(z) of encryption by said homomorphic encryption function φ of the element z function of the received message m.

The element s is an element of $\mathbb{Z}_n$ and is conventionally expressed:

$$s = \left(\frac{1}{k}\right) \cdot (z + d \cdot r) \bmod n$$

In a first embodiment, this signature token can comprise a first part of signature token. Such a first part of signature token noted φ(r) can be generated by encrypting the computed intermediate integer (r) by means of said homomorphic encryption function φ. It can also comprise a second part of signature token φ(1/k) generated by encrypting the inverse of the random 1/k by means of said homomorphic encryption function φ.

In this embodiment, the signature of the message m encrypted by means of said homomorphic encryption function can comprise a first part of signature encrypted by means of said homomorphic encryption function and generated by means of the formula: φ(s)=φ((1/k)*(z+d.r)) and a second part of signature encrypted by means of said homomorphic encryption function equal to φ(r) with 1/k the inverse of the random, z function of the message m, d the private key stored by the client device, r the computed intermediate integer and φ the homomorphic encryption function.

By way of the homomorphic property of the function φ, the first part of encrypted signature φ(s) can be computed from the encrypted token φ(1/k),φ(r), of the encrypted private key φ(d) and of the encrypted message φ(z) without having to decrypt any of these elements.

In a second embodiment, the signature token further comprises the result φ(r.1/k) of the encryption by said homomorphic encryption function of the product of the computed intermediate integer with the inverse of the random 1/k. During the step for generating signature 105 the first part of encrypted signature φ(s) can therefore be generated by means of the formula:

$$\varphi(s)=\varphi((1/k).z+d.(r.1/k))$$

The only homomorphic operations on the multiplication to be computed are computation of φ((1/k).z) from φ(1/k) and φ(z) and computation of φ(d.(r.1/k)) from φ(d) and φ(r.1/k). The computation of the signature therefore needs homomorphic multiplications of the order 1 only and is lighter than in the preceding embodiment wherein it is necessary to compute a first multiplication of the order 1, for example φ(d.r) from φ(d) and φ(r), then multiplication of second order, for example φ(1/k.d.r) from φ(1/k) and of the result of the computation of φ(d.r).

In the two embodiments, the signature is obtained in encrypted form φ(r), φ(s). It can be transmitted to the client device 2 and/or to the hardware security module 4 and stored by the latter in encrypted form. Alternatively the signature can be decrypted prior to storage, provided the device performing this decryption knows the private key of the homomorphic encryption skci for decrypting the encrypted elements.

In the event of storage in encrypted form, the signature can be decrypted during its verification only, for example prior to its transmission to the verifier server. In the case of execution according to the DSA or ECDSA algorithm, such verification can be conducted by the verifier server as per the standard DSA or EDCSA algorithm of the state of the art.

In all the embodiments, once the token is generated, the elements having contributed to its generation (k, 1/k, $g^k$, r, r.1/k) can be deleted to limit risk of hacking. For security reasons the token generated can also be used only once for generating a signature.

The computations constituting the heaviest steps of the computation of a signature can be made offline in advance, without endangering the security of the signature mechanism by way of encryption of the token. The use of a homomorphic function limits the cost of computation of a signature by a client device by delegating computations in encrypted form.

The invention claimed is:

1. A method for generating a signature of a message (m) intended to be validated by a verifier server (3), the signature protocol implemented for generating the signature comprising public parameters (Gr, n, g) such that g is an element of the group Gr of the order n with n a prime integer,
   a client device (2) being configured to hold a private key (d) and a corresponding public key (y), said method being characterized in that it comprises steps of:
      offline beforehand computation (103) by a hardware security module (4) of a signature token (φ(r), φ(1/k)) comprising a first part of signature token φ(r) and a second part of signature token φ(1/k), wherein k is a random integer comprised between 1 and n−1, and r is an intermediate integer defined by r=f($g^k$) where f is a function having values in $\mathbb{Z}_n$, and the first part of signature token φ(r) is generated by encrypting the intermediate integer r by means of a homomorphic encryption function (φ) and the second part of signature token φ(1/k) is generated by encrypting the inverse of the random 1/k by means of a homomorphic encryption function (φ),
      storage (104) of said signature token (φ(r), φ(1/k));
      generation (105) of said signature (r,s) of said message (m) encrypted by means of a homomorphic encryption function (φ(r), φ(s)) from the result (φ(d)) of the encryption by a homomorphic encryption function of the private key stored by the client device (d), of the signature token (φ(r), φ(1/k)) and of said message (m), said signature being intended to be validated by said verifier server (3) by means of said public key (y).

2. The method for generating a signature according to claim 1, wherein said hardware security module also previously offline implements steps of:
   generation (101) of the random k as integer belonging to [1;n−1]; and
   computation (102) of the intermediate integer r.

3. The method for generating a signature according to claim 1 wherein the signature protocol is the ECDSA protocol, the group Gr is the group comprising all the points of an elliptic curve provided with addition, the public key y and the private key d verify y=d*g, g being a point of the elliptic curve of the order n, the function f associates with a point of the elliptic curve the abscissa modulo n of said point, and the intermediate integer r is the abscissa of the point of the elliptic curve k*g modulo n.

4. The method for generating a signature according to claim 1, wherein the signature protocol is the DSA protocol, the group $G_r$ is the set $\mathbb{Z}_p$ provided with multiplication, where p is a prime integer number such that (p−1) is a multiple of n, the public key y and the private key d such that 0<d<n verify y=$g^d$ mod p, g=$h^{((p-1)/n)}$ mod p with h a random integer verifying 1<h<p−1 and g different to 1, the function f is defined by f(x)=x mod n, and the intermediate integer r is r=($g^k$ mod p) mod n.

5. The method for generating a signature according to claim 1, wherein the signature of the message m encrypted by means of said homomorphic encryption function comprises a first part of signature encrypted by means of said homomorphic encryption function and generated by means of the formula: φ(s)=φ((1/k)*(z+d.r)) and a second part of signature encrypted by means of said homomorphic encryption function equal to φ(r), with 1/k the inverse of the random, z function of the message m, d the private key stored by the client device, r the intermediate integer and φ the homomorphic encryption function.

6. The method for generating a signature according to claim 1, wherein the signature token further comprises the result φ(r.1/k) of the encryption by said homomorphic encryption function of the product of the intermediate integer r with the inverse of the random 1/k.

7. The method for generating a signature according to claim 1, wherein the signature of the message m encrypted by means of said homomorphic encryption function comprises a first part of signature encrypted by means of said homomorphic encryption function and generated by means of the formula: φ(s)=φ((1/k).z+d.(r.1/k)) and a second part of signature encrypted by means of said homomorphic encryption function equal to φ(r),
   with 1/k the inverse of the random, z function of the message m, d the private key stored by the client device, r the intermediate integer, r.1/k the product of the intermediate integer with the inverse of the random and φ the homomorphic encryption function.

8. A method for generating a signature of a message (m) intended to be validated by a verifier server (3), a client device (2) being configured to hold a private key (d) and a corresponding public key (y) wherein the public key y and the private key d verify y=d*g, g being a point of an elliptic curve of the order n, a prime integer, said method being characterized in that it comprises steps implemented previously offline by a hardware security module (4) of:
- generation (101) of a random k as integer belonging to [1, n−1],
- computation (102) of an intermediate integer r as abscissa of the point of the elliptic curve k*g modulo n;
- computation (103) of a signature token (φ(r), φ(1/k)) comprising a first part of signature token φ(r) generated by encrypting the intermediate integer r by means of a homomorphic encryption function (φ), and a second part of signature token φ(1/k), generated by encrypting the inverse of the random 1/k by means of a homomorphic encryption function (φ), the method further comprising implementing the steps of:
- storage (104) of said signature token (φ(r), φ(1/k));
- generation (105) of said signature (r,s) of said message (m) encrypted by means of a homomorphic encryption function (φ(r), (φ(s)) from the result (φ(d)) of the encryption by a homomorphic encryption function of the private key stored by the client device (d), of the signature token (φ(r), φ(1/k)) and of said message (m), said signature being intended to be validated by said verifier server (3) by means of said public key (y).

9. A method for generating a signature of a message (m) intended to be validated by a verifier server (3), a client device (2) being configured to hold a private key (d) and a corresponding public key (y), wherein the public key (y) and the private key d such that $0<d<n$ verify $y=g^d \mod p$, n being a prime number, p being a prime number verifying (p−1) is a multiple of n, $g=h^{((p-1)/n)} \mod p$ with h a random integer verifying $1<h<p-1$ and g different to 1, said method being characterized in that it comprises steps implemented previously offline by a hardware security module (4) of:
- generation (101) of a random k as integer belonging to [1, n−1],
- computation (102) of an intermediate integer $r=(g^k \mod p) \mod n$;
- computation (103) of a signature token (φ(r), φ(1/k)) comprising a first part of signature token φ(r) generated by encrypting the intermediate integer r by means of a homomorphic encryption function (φ), and a second part of signature token φ(1/k), generated by encrypting the inverse of the random 1/k by means of a homomorphic encryption function (φ), the method further comprising implementing the steps of:
- storage (104) of said signature token (φ(r), φ(1/k));
- generation (105) of said signature (r,s) of said message (m) encrypted by means of a homomorphic encryption function (φ(r), (φ(s)) from the result (φ(d)) of the encryption by a homomorphic encryption function of the private key stored by the client device (d), of the signature token (φ(r), φ(1/k)) and of said message (m), said signature being intended to be validated by said verifier server (3) by means of said public key (y).

10. A non-transitory computer-readable medium storing program code instructions, wherein the program code instructions cause a computer to execute a method for generating a signature of a message, the method comprising steps of:
- offline beforehand computation (103) of a signature token (φ(r), φ(1/k)) comprising a first part of signature token φ(r) and a second part of signature token φ(1/k), wherein k is a random integer comprised between 1 and n−1, and r is an intermediate integer defined by $r=f(g^k)$ where f is a function having values in $\mathbb{Z}_n$, and the first part of signature token φ(r) is generated by encrypting the intermediate integer r by means of a homomorphic encryption function (φ) and the second part of signature token φ(1/k) is generated by encrypting the inverse of the random 1/k by means of a homomorphic encryption function (φ);
- storage (104) of said signature token (φ(r), φ(1/k));
- generation (105) of said signature (r,s) of said message (m) encrypted by means of a homomorphic encryption function (φ(r), φ(s)) from the result (φ(d)) of the encryption by a homomorphic encryption function of the private key stored by the client device (d), of the signature token (φ(r), φ(1/k)) and of said message (m), said signature being intended to be validated by means of said public key (y).

11. A system (1) for generating a signature of a message (m) intended to be validated by a verifier server (3), the signature protocol implemented for generating the signature comprising public parameters (Gr, n, g) such that g is an element of the group Gr of the order n with n a prime integer,
- a client device (2) being configured to hold a private key (d) and a corresponding public key (y), said system comprising:
- a hardware security module (4) configured to compute beforehand, offline, a signature token (φ(r),φ(1/k)) comprising a first part φ(r) of signature token and a second part φ(1/k) of signature token, wherein k is a random integer comprised between 1 and n−1, and r is an intermediate integer defined by $r=f(g^k)$ where f is a function having values in $\mathbb{Z}_n$, and the first part of signature token φ(r) is generated by encrypting the intermediate integer r by means of said homomorphic encryption function (φ) and the second part of signature token φ(1/k) generated by encrypting the inverse of the random 1/k by means of said homomorphic encryption function (φ),
- a storage device (8) of said signature token (φ(r),φ(1/k)),
- an intermediate server (7) or said hardware security module (4) configured to generate said signature (r,s) of said message (m) encrypted by means of said homomorphic encryption function (φ(r), φ(s)) from the result (φ(d)) of the encryption by said homomorphic encryption function (φ) of the private key stored by the client device (d), of the signature token (φ(r), φ(1/k)) and of said message (m),
- a verifier server (3) configured to validate said signature by means of said public key (y).

* * * * *